United States Patent [19]

Chen

[11] Patent Number: 4,955,288

[45] Date of Patent: Sep. 11, 1990

[54] CAKE MANUFACTURING MACHINE

[76] Inventor: Tsai-An Chen, 201, Sec.3, BA-DAR Road, Taipei, Taiwan

[21] Appl. No.: 235,275

[22] Filed: Aug. 23, 1988

[51] Int. Cl.[5] .................. A47J 37/00; A47J 44/00
[52] U.S. Cl. ........................... 99/348; 99/423; 99/443 C; 366/24; 366/45; 366/185; 366/103
[58] Field of Search ............ 99/348, 403, 404, 407, 99/423, 424, 443 C; 366/12, 13, 24, 45, 91, 103, 105, 185, 192, 344

[56] References Cited

U.S. PATENT DOCUMENTS

| | | | |
|---|---|---|---|
| 438,028 | 10/1890 | Staff | 99/348 |
| 2,005,996 | 6/1935 | Kraft | 99/348 |
| 2,477,269 | 7/1949 | Sandler | 366/105 X |
| 2,773,679 | 12/1956 | Miller | 366/344 |
| 3,695,171 | 10/1972 | Hartley et al. | 99/407 X |
| 3,749,373 | 7/1973 | Kemper | 366/91 |
| 4,231,974 | 11/1980 | Engelbrecht et al. | 366/103 X |
| 4,322,202 | 3/1982 | Martinez | 366/91 X |
| 4,666,730 | 5/1987 | Mergelsberg | 366/105 X |
| 4,699,517 | 10/1987 | Sella | 366/45 |
| 4,751,877 | 6/1988 | Andersson | 99/443 C |

FOREIGN PATENT DOCUMENTS

| | | | |
|---|---|---|---|
| 1305088 | 11/1961 | France | 366/45 |
| 378841 | 8/1932 | United Kingdom | 366/185 |

*Primary Examiner*—Stephen Marcus
*Assistant Examiner*—Christine A. Peterson
*Attorney, Agent, or Firm*—Morton J. Rosenberg; David I. Klein

[57] ABSTRACT

A cake manufacturing machine that can churn the ingredient for cake with hollow churning claws along the filtered compressed air coming out of the claws and then the ingredient churned can be dropped down in a funnel, then flow doen in aheating device in which the ingredient can be moved in a plurality of aqueezing cylinders by a screwed rod set therein and at the same time heated by hot air flowing into a sealed box containing each squeezing cylinder. The ingredient moved in the squeezing cylinder and half baked during the movement is to be dropped down on a baking plate put on a boving belt of a conveying device and is finally conveyed to a baking oven for complete baking.

9 Claims, 7 Drawing Sheets

CAKE MANUFACTURING MACHINE

BACKGROUND OF THE INVENTION

The subject invention is directed to a cake manufacturing machine which provides for cakes which have a more homogeneous texture than those cakes previously baked and known in the prior art. Generally, prior art cakes have been found to have a non-homogeneous texture throughout the volume of the cake and includes a hardened bottom layer which provides a non-uniform texture not amenable to the tastes of a number of persons. Other prior art systems provided cakes which were prone to stick to the user's teeth. The subject invention cake manufacturing system provides for a machine which can churn or agitate batter or ingredients combined for the cake manufacturing process in an optimized fashion. Additionally, compressed, filtered air may be inserted into the ingredients within an agitating or churning vessel to provide a uniform, porous and spongy batter ingredient prior to initial baking.

PRIOR ART

In prior art systems during the cake manufacturing process, the ingredients are churned or agitated by screw rods rotated by a mechanical transmission. Air is directly forced into the ingredients during the agitation process, however, the leaves formed on the rotating shafts are inserted into the ingredients within the agitation vessel and the central portion of the ingredients are easily agitated or churned into a uniform state, however, the circumferential portions have been found to be non-homogeneous in nature.

Additionally, it has been found in prior art systems that the air bubbles formed in the churning process are expended from the ingredients as the air passes to a top surface and thus, the lower layers of the baked products have less air pores than the upper layers which include larger air pores leading to a non-homogeneous texture. This non-homogeneous texture has led to a feeling of unpalatability by the user during the eating process and thus, provides for disadvantages in such prior art systems.

In general, prior art systems produced by traditional manufacturing process have provided for air pores spaced far apart in the final baked cake food product. The air is directly taken into the ingredient during the process of churning and a limited area or volume of the batter is churned so that the ingredient has to be churned for an excessively long period of time wherein air bubbles inserted into the batter pass from the batter to the external environment.

Such prior art systems provided for inferior texture in the sponginess of the finally produced cake. The air bubbles have been found to float from the lower batter area or volume and thus, the lower layer becomes more dense than the upper layer which leads to a non-homogeneous texture and an inferior sponginess for the eating process.

SUMMARY OF THE INVENTION

A cake manufacturing machine for partially baking cakes prior to insert of said partially baked cakes into a baking oven to produce a finally baked product is provided which includes a main frame. A support frame is rotatably secured to the main frame. A churning mechanism for agitating ingredients contained within the churning mechanism is provided and the churning mechanism includes a churning vessel which is rotatively coupled to the main frame for tilting the churning vessel through a predetermined angle to allow flow of the agitated ingredients into a funnel member by gravity assist. A heating device defining a hot air box partially bakes the agitated ingredients. The heating device is in aligned communication with the funnel member for insert of the ingredients therein. A mechanism for extruding the partially baked ingredients from the heating device is provided and the extruding mechanism includes an extrusion cylinder for transporting the partially baked ingredients through the heating device. A conveying mechanism located below the extrusion cylinder for containing and transporting cake plate members into alignment with the extrusion cylinder for extruding the partially baked ingredients into the cake plate members for transport into the baking oven.

DESCRIPTION OF THE PREFERRED EMBODIMENTS

Figure 1:
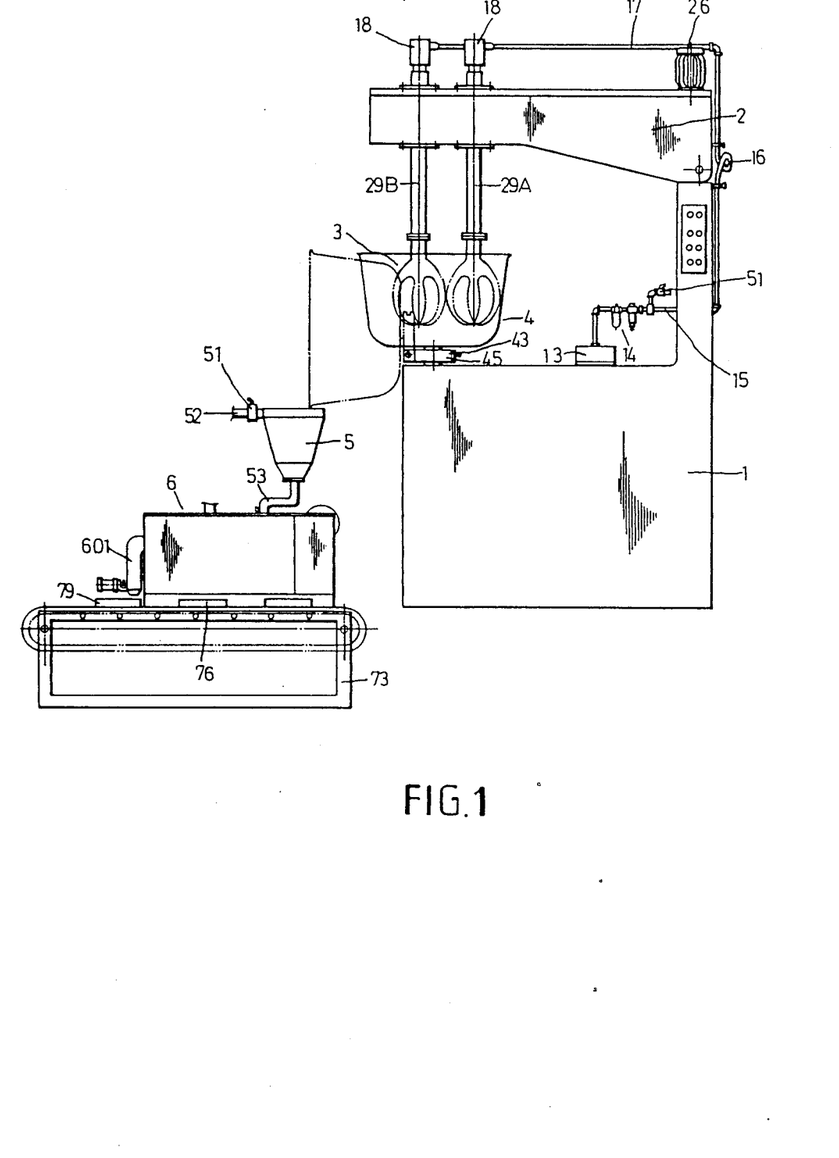
FIG. 1 is an elevational view of the cake manufacturing machine in accordance with the present invention.
Figure 8:
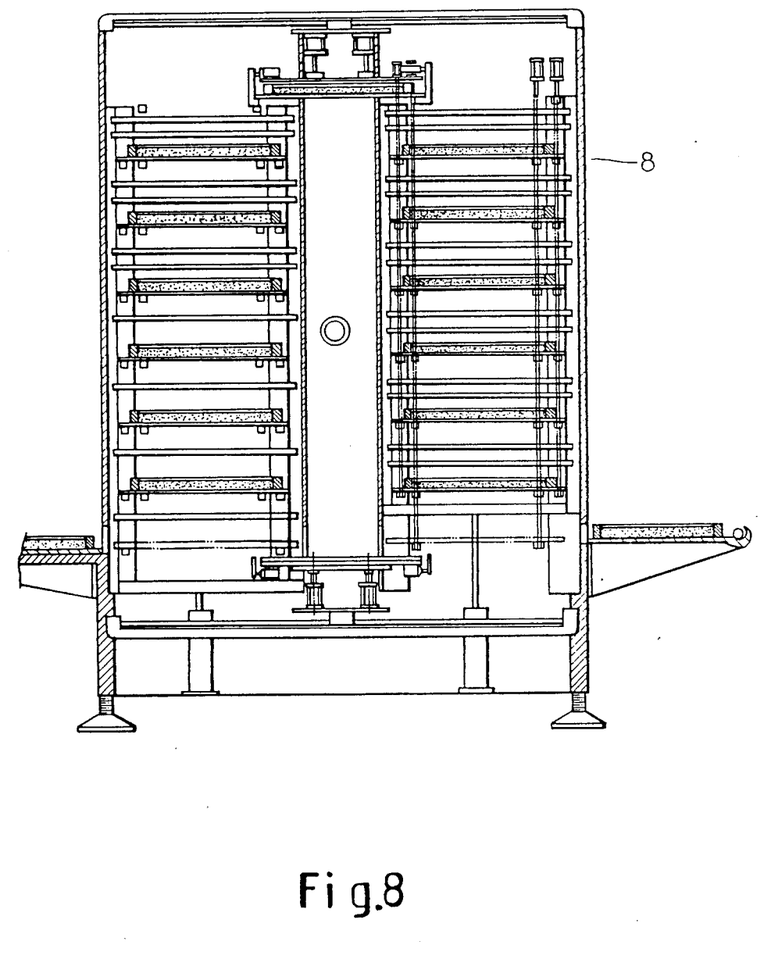

Referring now to FIGS. 1-8, and in particular, FIG. 1, there is shown a cake manufacturing machine which includes main frame 1 mounted on a base surface (not shown). Support frame 2 is rotatably mounted to main frame 1 and is coupled thereto to provide agitation of ingredients within churning or agitating vessel 4 of churning mechanism 3. As will be shown in following paragraphs, churning vessel 4 may be rotated to insert ingredients within funnel 5 for passage therethrough to heating mechanism 6 where ingredients are partially baked and heated prior to insertion onto conveying device 7 (shown in FIGS. 1 and 7) and then inserted into a standard and conventional baking oven 8, as is shown in FIG. 8.

Figure 5:
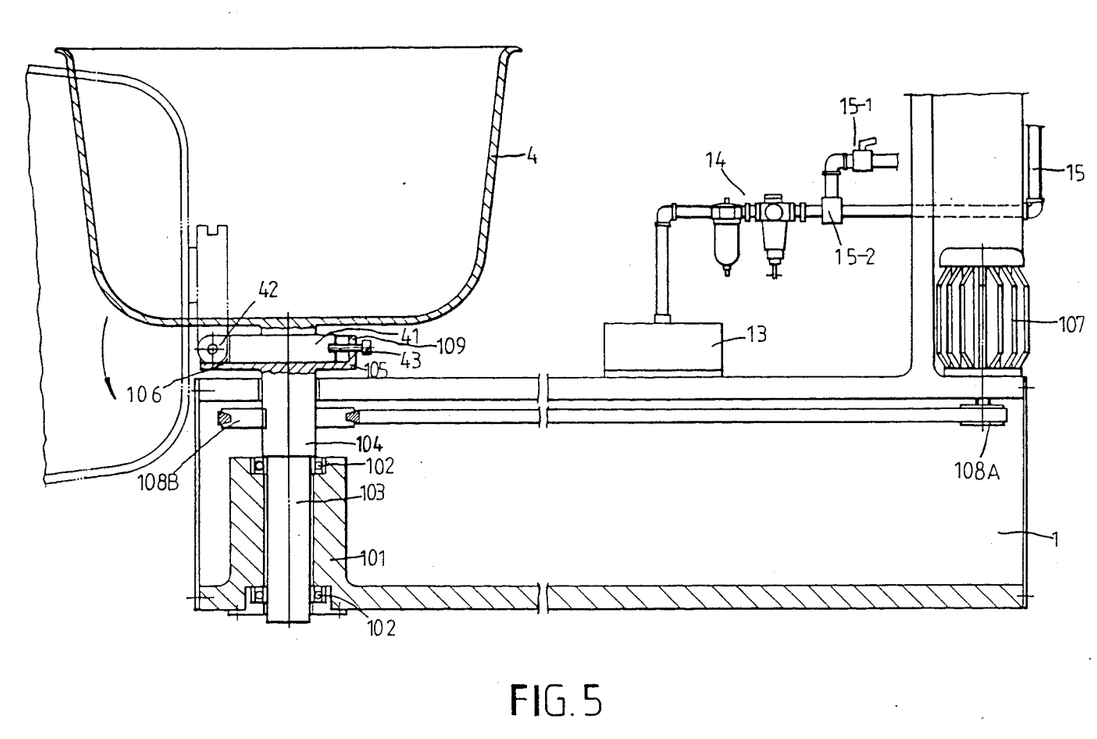
FIG. 5 is a cross-sectional view of the churning mechanism including the churning vessel in accordance with the present invention.

Referring now to FIG. 5, main frame 1 includes post-shaped bearing base member 101 secured thereto. Post-shaped bearing base 101 has a vertically directed opening for turning shaft 103 to be inserted therethrough and rotatable with respect to base 101. Ball bearing 102 mounted at the upper end of bearing 101 is provided for interface with turning shaft 103 which has a larger diameter portion 104 extending upwardly to flange 109 which abuts larger diameter section 104.

Flange 109 has a protruding ear member 106 having a central hole at a left hand portion as shown in FIG. 5, as well as a bolt hole at the right section. First motor 107 is mounted on the right hand side of main frame 1 (as shown in FIG. 5).

A belt wheel 108A is mounted to the shaft of first motor 107 and a belt wheel 108B is mounted on the portion 104 of turning shaft 103. An endless belt is mounted around both belt wheels 108A, 108B in order that a rotational activation of first motor 107 may be transmitted to rotate the shaft 103.

An air compressor 13 is mounted on main frame 1 and connected to an air filter 14, as is shown. Additionally, air compressor 13 is coupled to magnetic valve 15-2, and water valve 15-1 through respective conduits. The magnetic valve 15-2 is horizontally connected in fluid communication by a transporting tube 15 and a convoluted tube 16, as well as a transporting tube or conduit 17 to the rotational joint 18, as is shown in FIG. 1. The convoluted tube 16, transport tube 17, in combination with rotational or turning joints 18 are clearly seen in FIG. 2. Rotational activation between main frame 1 and support frame 2 is provided by extending upturned edges 11 as shown in FIG. 2 and as shown in FIG. 4, provides for a hole 12 for the shaft 23 to penetrate therethrough to allow coupling of main frame 1 to support frame 2 and further allow rotational activation by handle member 24.

Figure 2:
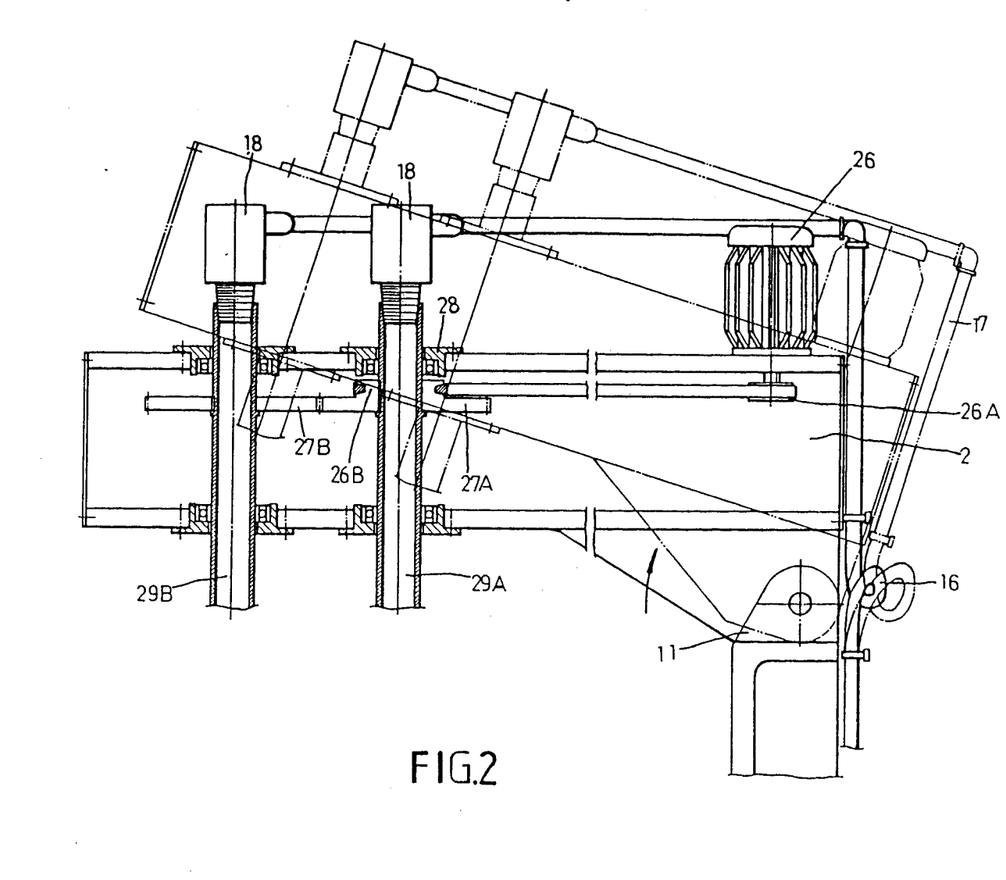
FIG. 2 is a cross-sectional view of the supporting frame showing rotation thereof in phantom line drawings.
Figure 4:
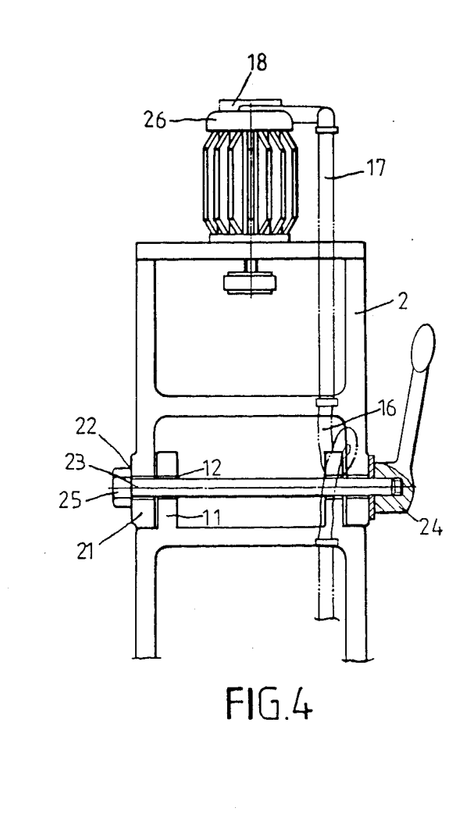
FIG. 4 is a side view of the supporting frame in accordance with the present invention.

Referring now to FIGS. 2 and 4, support frame 2 includes an extending downturned edge 21 with a central hole 22 formed separately at both ends of the lower sides thereof. Shaft 23 penetrates the holes 22 and 12 of the extending downwardly directed edges 21 and the extending upwardly directed edges 11 for coupling support frame 2 with main frame 1. Handle 24 is threaded with the right end of the shaft 23 and a nut member 25 is threaded to the left end.

As seen in FIGS. 1 and 2, second motor 26 is mounted on support frame 2 to drive belt wheel 26A fixed on the shaft of second motor 26. Additionally, belt wheel 26B fixed on hollow churning shaft 29A is similarly driven.

Figure 3:
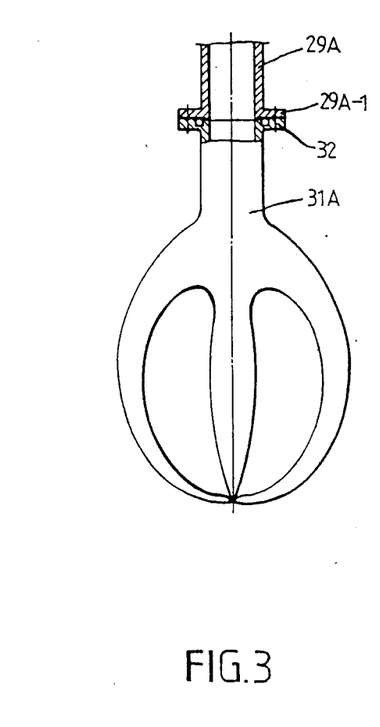
FIGS. 3 and 3A are, respectively, an elevational view of a claw member rotatably secured to the supporting frame and a greatly enlarged portion thereof.
Figure 3A:
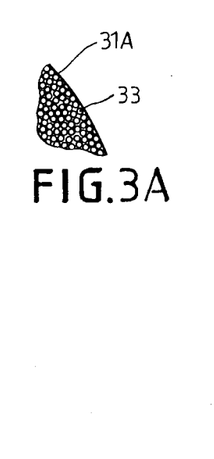

A gear 27A is fixed on hollow turning shaft 29A under belt wheel 26A and engages with gear 27B on a hollow churning shaft 29B threaded with another turning joint 18. Lower ends of the churning shafts 29A, and 29B are separately provided with flanges 29A1, and 29B1 for coupling to flanges 32 of churning of agitating claws 31A and 31B, as is shown in FIG. 3.

Churning mechanism 3 includes a pair of hollow churning claws 31A, 31B having a plurality of perforations or holes 33 formed through associated faces. Flanges 32 are formed at the upper ends of claws 31A and 31B to be coupled to the flanges 29A1 and 29B1 of the hollow churning shafts 29A and 29B, as is seen in FIG. 2.

Churning mechanism 3 further includes churning vessel member 4 shown clearly in FIG. 5 and is contoured as a bucket. Churning vessel member 4 is provided at its lower portion with a bottom base 41 having a protruding ear member 42 with a centrally located hole on the left side as viewed in FIG. 5. The protruding ear member 42 is combined with the protruding ear 106 of the shaft base 105 with a bolt in order that churning or agitating vessel member 4 may be combined with the shaft 103 and revolved thereby. Additionally, a shaft base 105 may be released if the churning vessel 4 is to be tilted by a predetermined inclination angle for inserting the ingredients from vessel 4 into a funnel member 5, as is shown in FIG. 1 in phantom line drawing.

Figure 6:
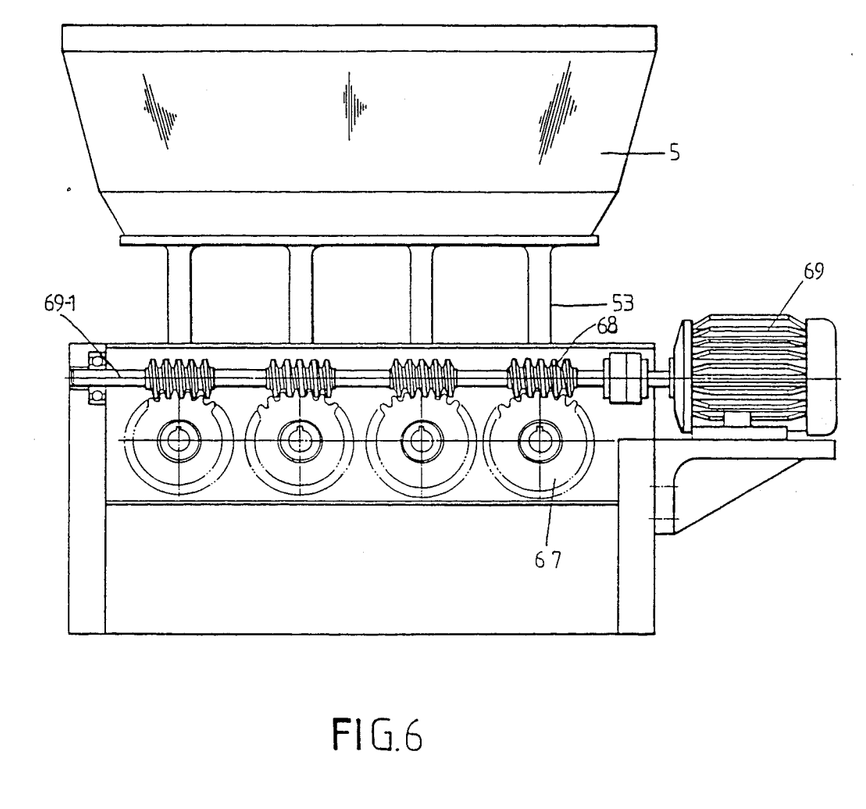
FIG. 6 is a side view of the heating device in communication with a funnel member for insert of ingredients therein.
Figures 6A, 7:
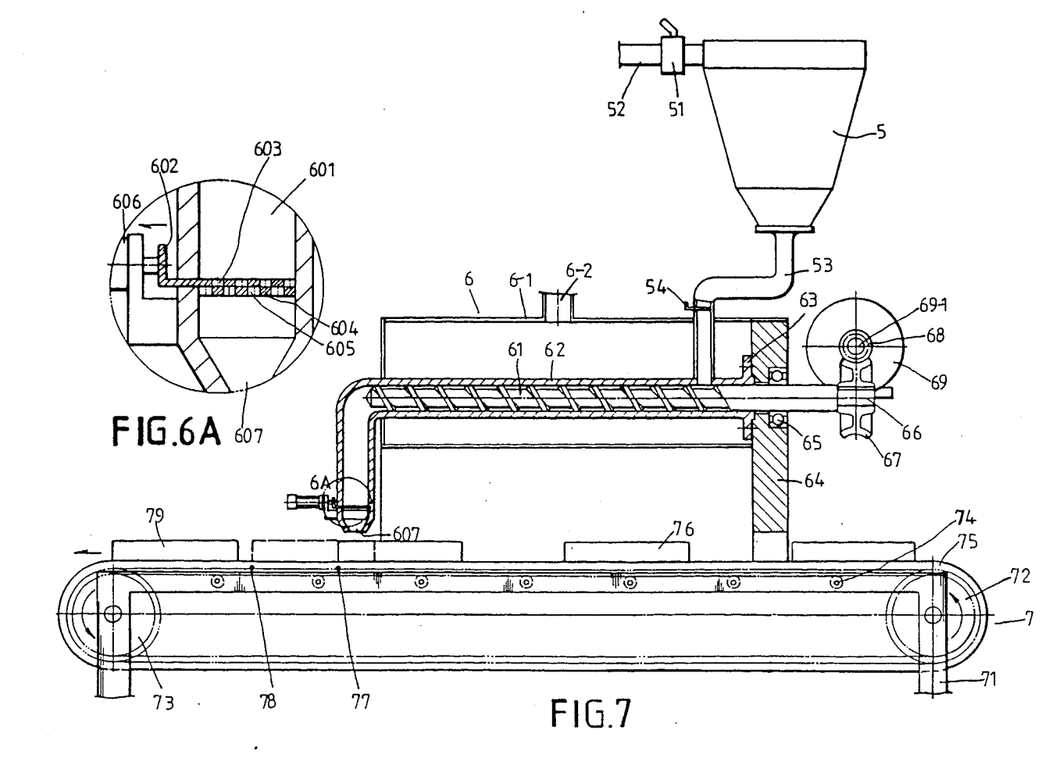
FIGS. 6A and 7 are, respectively, an enlarged portion of, and a side view of the heating device including the extrusion mechanism for passing heated ingredients onto a conveyor for insert into a baking oven; and, FIG. 8 is a frontal view of a baking oven in accordance with the present invention concept.

Funnel member 5 shown clearly in FIGS. 6 and 7, is contoured as a rectangular vessel with a tapered lower section in fluid communication at an upper portion with water tube 52 and valve 51 utilized for washing and cleaning the funnel member 5. A plurality of bent tubes 53 are in fluid communication with the lower tapered section of funnel member 5 in order to allow ingredients to flow into heating mechanism 6 by gravity assist. A shutter valve 54 is provided in bent tubes 53 to adjust the volume of the ingredients flowing into heating device 6.

Heating device 6 clearly shown in FIGS. 6 and 7 is used for partially baking and heating the ingredients passing from funnel member 5. The partial heating allows for coagulation of the overall agitated ingredients prior to insertion onto conveying device 7 for insert into baking oven 8. Heating device 6 includes a shaft 69-1 driven by third motor 69. Referring to FIG. 6, heating device shaft 69-1 has fixed thereon a plurality of worm wheels 68 engaging with respective worm wheels 67, as is shown. A threaded rod 61 as shown in FIG. 7 is fixed in a central hole of each worm wheel 67 and is maintained horizontally by the ball bearing 65 set in the vertical supporting wall 64. An L-shaped squeezing or extrusion cylinder 62 is mounted to surround each of the threaded rods 61 and such has on its horizontal section a flange 63 threaded into the inside face of the supporting wall 64. All of the horizontal sections of the squeezing or extrusion cylinders 62 are separately contained in a sealed box 6-1 having a hot air inlet 6-2 for communication therethrough of hot air to flow into heating device 6 for partially baking the ingredients flowing in the L-shaped squeezing or extrusion cylinder 62. Additionally, there is an outlet 607 at the lower end of the vertical section of each extrusion cylinder 62 in order to allow the ingredients to pass onto baking plates 76 mounted and movable on conveying device 7.

Referring now to FIG. 7, a squeezing gate mechanism 6A is provided at a lower portion of the vertical section of the extrusion or squeezing cylinder 62. The squeezing gate device 6A includes an upper gate 602 and a lower gate 604. Both gates 602 and 604 include a plurality of through holes 603 and 605 in alignment in order to allow ingredients to pass therethrough when gate device mechanism 6A is opened.

An air compressor 606 is mounted beside the gate device 6A and includes a piston rod which is connected to the edge of the upper gate 602 to allow reversible retraction in order to open or close the gate device 6A. This essentially allows alignment between the holes 603 and 605, or provides a blocking condition. Operation of the particular working time of the compressor 606 is controlled by an open sensor 77 and a closed sensor 78 provided on conveying device 7 which is not part of the inventive concept, with the exception that ingredients be inserted onto baking plate 76 in sequential and aligned fashion.

Conveying device 7 is placed below heating device 6 as is shown in FIG. 7. Conveying device 7 is provided with a supporting frame 71 and chain wheels 72 and 73 which are driven by a motor and are separately mounted on opposing ends for driving rubber belt 75 in order to convey baking plates 76 and 79 filled with half-baked ingredients mounted thereon. Such half-baked ingredients are then transported to a baking oven 8 to complete the baking process. A plurality of supporting rolls 74 are provided on the horizontal section of the supporting frame 7 and are equally spaced apart from each other between wheels 72 and 73 in order to support the weight of the baking plate 76 and 79 mounted on the belt 75.

The baking oven 8 as shown in FIG. 8 is of standard prior art construction and is generally provided with an automatic temperature controller and an automatic elevating and descending mechanism not important to the inventive concept as herein described.

In operation, and referring to FIGS. 1-8, initially all of the ingredients of the cake are placed in the churning vessel 4. The second motor 26 and the motor of the compressor 14 are started to turn or rotate the churning claws 31A and 31B. Additionally, air is sent by the compressor 13 through the air filter 14 and then through the transporting tube 15, the bent tube 16, the transporting tube 17, the turning joints 18, the hollow churning shafts 29A and 29B and then through the churning claws 31A and 31B into the ingredients to be agitated more quickly and uniformly than has previously been known.

Subsequent to the ingredients in the vessel member 4 being agitated enough for baking, the vessel member 4 is tilted to drop the ingredients by gravity assist into the funnel 5. An operator releases the handle 24 for moving the supporting frame 2 such that the churning claws 31A and 31B are inclined upwardly to the extent that they do not hamper the vessel member 4 in tilting approximately 90° for dropping the ingredients into the funnel member 5. The bolt 43 is removed or released from the bolt hole in the bottom base 41 so that the vessel member 4 may be tilted outward to allow the ingredients to flow down through the bent tube 53 and into the squeezing cylinder 62 while having the volume adjusted by manual actuation of the shutter valve 54.

The interior of each box 6-1 is previously warmed by hot air coming through the hot air inlet 6-2. Ingredients moving through the squeezing cylinder 62 are gradually heated to a previously set temperature which corresponds generally to a half-baked condition.

The half-baked ingredient is transported to the outlet passage 601 by rotation of the threaded rod 61. Simultaneously, the motor of the conveying device 7 is initiated to move the chain wheels 72 and 73 and transporting the baking plates 76 on the belt 75 in a forward direction.

When one of the baking plates 76 is adjacent to the open sensor 77, the sensor 77 activates the compressor 606 to pull the upper gate 602 open in a manner so that the half-baked ingredients may flow down the outlet 607 into the baking plate 76. When the baking plate 76 moves into alignment with the closed sensor 78, the compressor 606 is activated to push the upper gate 602 to shut the outlet passage 601 which terminates the half-baked ingredient from flowing out of the outlet 607. The baking plate 76 is then filled with half-baked ingredients and is finally conveyed to the baking oven 8 for finishing baking, as is shown in FIGS. 6 and 7.

In the event that the hollow churning claws 31A and 31B are to be washed and cleaned, the magnetic valve 15-2 may be rotated and the water valve 15-1 may be opened to allow water flow through the transporting tube 15, the bent tube 16, the transporting tube 17, the turning joints 18, the hollow churning shafts 29A and 29B, and then through the holes 33 in the churning claws 31A and 31B, and then falling into the churning vessel 4. If the funnel member 5 and the extrusion or squeezing cylinders 62 are to be washed and cleaned, the water valve 51 may be opened to allow water in the water tube 52 to flow into the funnel member 5 through the bent tubes 53, squeezing cylinder 62, the upper gate 602, the lower gate 604, and finally through the outlet 607.

Generally, what has been provided is a cake manufacturing machine which allows a cake to have a uniform spongy porous quality. As churning of the ingredients with the hollow churning claws are provided in combination with the cleaned filtered air blown through a number of holes in the claws and further with the slow revolution of the churning vessel, such enables the ingredients to be quickly agitated or churned to have a uniform porous state for the baking product.

Additionally, the subject cake manufacturing machine produces a more spongy cake. Filtered clean air is directly mixed in the ingredients so that the ingredients may contain uniform pores of proper size and may be dropped into a funnel member and sent to an extrusion cylinder to be half-baked with the pores stabilized.

Finally, the half-baked ingredients as provided has uniform air pores so that the completely baked cake made from it may contain tiny pores to enable an eater to feel a spongy texture while eating. Larger volume cakes may be produced with the same quantity of material as known in the prior art by this cake making machine and thus provides for economization of materials used.

What is claimed is:

1. A cake manufacturing machine for partially baking cakes prior to insert of said partially baked cakes into a baking oven, comprising:
    (a) a main frame;
    (b) a support frame rotatably secured to said main frame;
    (c) churning means for agitating ingredients contained therein, said churning means including a churning vessel rotatably coupled to said main frame for tilting said churning vessel through a predetermined angle to allow flow of agitated ingredients into a funnel member by gravity assist;
    (d) a heating device defined by a box heated by hot air for partially baking said agitated ingredients, and heating device in aligned communication with said funnel member;
    (e) means for extruding said partially baked ingredients from said heating device, said extruding means including an extrusion cylinder for transporting said partially baked ingredients through said heating device; and,
    (f) conveying means located below said extrusion cylinder for containing and transporting cake plate members into alignment with said extrusion cylinder for extruding said partially baked ingredients into said cake plate member for transport into said baking oven.

2. The cake manufacturing machine as recited in claim 1 where said main frame includes:
    (a) a first motor mounted on said main frame; and,
    (b) a rotatable shaft member coupled to said first motor by an endless wheel belt for rotational actuation of said rotatable shaft, said rotatable shaft member being secured to a shaft base member, said churning vessel being rotatably secured to said shaft base member by a pair of protruding ear members about which said churning vessel is pivotal.

3. The cake manufacturing machine as recited in claim 2 including:
   (a) an air compressor mounted on said main frame, said air compressor in fluid communication with an air filter and a water conduit;
   (b) a pair of hollow churning claw members insertable into said churning vessel for agitating said ingredients, said hollow churning claw members coupled to and in fluid communication with said air compressor, said hollow churning claw members having perforations formed therethrough for passage of air from said air compressor.

4. The cake manufacturing machine as recited in claim 1 wherein said support frame includes:
   (a) a second motor mounted thereon;
   (b) a pair of rotatable claw shafts, rotatably driven by an endless belt coupling said second motor to said pair of rotatable claw shafts, said rotatable claw shafts being hollow for defining a fluid communication path therethrough; and,
   (c) a pair of hollow claw members having perforations formed therethrough for passage of air, said hollow claw members being rigidly secured to said pair of rotatable claw shafts.

5. The cake manufacturing machine as recited in claim 1 including a pair of hollow churning claw members rotatably secured to said support frame, said claw members being rotatably insertable into said churning vessel, said claw members having a plurality of holes formed through each of said claw member face surfaces for passing air therethrough.

6. The cake manufacturing machine as recited in claim 1 where said churning vessel member is bowl shaped, said churning vessel member having a protruding ear member formed at a bottom section thereof, said protruding ear member of said vessel member being rotationally coupled to a respective ear member of a shaft base member mounted on said main frame, said churning vessel member being rotatably displaceable with respect to said main frame.

7. The cake manufacturing machine as recited in claim 1 where said funnel member is rectangularly contoured, said funnel member having a water tube passing through a sidewall thereof for insert thereto of cleansing water, said funnel member having a shutter valve member mounted thereto at a lower section for controlling ingredient flow to said heating device.

8. The cake manufacturing machine as recited in claim 1 where said heating device includes:
   (a) a rotational shaft driven by a third motor;
   (b) a plurality of worm gears fixed on said rotational shaft and engaged with respective worm wheels; and,
   (c) a plurality of L-shaped extrusion cylinders containing a plurality of screw rods driven by said worm gears, said cylinders being located within said hot air box, said hot air box having a hot air inlet at an upper section for providing heated air to at least partially bake said ingredients.

9. The cake manufacturing machine as recited in claim 1 wherein said conveying means is located below said heating device, said conveying means includes motor means for driving a pair of chain wheels having mounted thereon a belt member for supporting a plurality of baking plates.

* * * * *